United States Patent [19]
Ullman et al.

[11] 3,716,335
[45] Feb. 13, 1973

[54] ASSAYING WITH CHANGE IN ELECTRON SPIN RESONANCE SPECTRUM BASED ON CHIRALITY

[75] Inventors: Edwin F. Ullman, Atherton; Richard S. Schneider, Sunnyvale, both of Calif.

[73] Assignee: Syva Corp., Palo Alto, Calif.

[22] Filed: May 3, 1971

[21] Appl. No.: 139,905

[52] U.S. Cl..........23/230 R, 23/232 R, 195/103.5 R, 260/243 R, 260/247.2 B, 260/251.5, 260/279 R, 260/293.7, 260/296 R, 260/299, 260/306.8 R, 260/307 H, 260/309.6
[51] Int. Cl..............................................G01n 27/78
[58] Field of Search.............23/230 R, 230 B, 232 R; 195/103.5 R

[56] References Cited
OTHER PUBLICATIONS

R. W. Kreilick et al., Electron Spin Resonance Studies of Nitronyl–Nitroxide Radicals with Asymmetric Centers, J. Amer. Chem. Soc., Vol. 91, No. 18, p. 5121–5124 (Aug. 27, 1969). QD1.A5.

*Primary Examiner*—Joseph Scovronek
*Attorney*—Townsend & Townsend

[57] ABSTRACT

A method and compounds are provided for determining amounts of energy or chemical reagents in a fluid medium by introducing into the medium a sensor which is a stable nitroxide radical functionality bonded through a methylene group to a central atom bonded to a plurality of functionalities, at least one of which participates in a chemical change, which results in a change of asymmetry about the carbon atom bonded to the methylene group.

15 Claims, No Drawings

ASSAYING WITH CHANGE IN ELECTRON SPIN RESONANCE SPECTRUM BASED ON CHIRALITY

BACKGROUND OF THE INVENTION

1. Field of the Invention

In many chemical reactions, induced by chemical or energetic means, and in many systems into which radiant energy is introduced, it is desirable to have a way of metering either instantaneously or in an integrated way, the amount of chemical reagent or energy introduced into the system. An extremely simple probe to determine the instantaneous amount of energy being introduced into a system is a thermometer. The thermometer is a good probe because it is inert to most systems, does not significantly affect most equilibria and the results can be read directly. However, the thermometer as a probe is limited to temperature changes, does not give an integrated value of the heat introduced into the system and in many instances, for mechanical reasons, cannot be placed at a position where both the measurement and the reading of the result are possible.

In many chemical transformations, it is frequently desirable to follow the course of the reaction, where it may not be convenient to assay for the product being formed. Also, there are frequently present minor amounts of constituents in a complex mixture, where the individual constituent is not readily isolatable or conveniently changed to another material which is detectable by spectrophotometric techniques. Similarly, in some instances, extremely exotic techniques may be required to evaluate an energy source, such as energy derived from an electrode. If one had a probe which was standardized, by introducing the probe into the medium into which electrical energy is being introduced, and following the change in the probe, one could evaluate the amount of electrical energy being introduced into the system. Quite obviously, there are many situations where simple and convenient methods would be desirable to rapidly determine the presence of a particular chemical, the amount of energy introduced, or the course of the chemical transformation, without disturbing the system being assayed.

2. Description of the Prior Art

In an article by Kreilick et al., J. Am. Chem. Soc., 91 5121 (1969) nitronyl nitroxide radicals were reported which were bonded through a methylene group to an asymmetric center wherein the other three groups were hydrogen, methyl and phenyl or pyridyl. It was found that by varying the pH, the spectrum of the pyridyl compound also varied, while the spectrum of the phenyl analog did not vary significantly. The preparation of a variety of nitronyl nitroxide radicals may be found in articles by Osiecki et al., ibid, 90 1078 (1968); Boocock et al., ibid, 90 6873 (1968) and Ullman et al., Chem. Comm. 1969, 1161. See also, articles cited therein. Nitroxide free radicals have been taught for spin labeling in U.S. Pat. Nos. 3,453,288 and 3,489,522.

SUMMARY OF THE INVENTION

Methods for metering energy or chemical reagents and compounds for use in such metering are provided which comprise a stable nitroxide radical, having an $\alpha$-imino or $\alpha$-nitronyl group bonded through a methylene group to a center whose asymmetry changes, with a change induced in the groups bonded to the center, by a chemical transformation other than the loss or gain or a proton due to a change in acidity of the medium. Because of the extreme sensitivity of the system, the radical probe can be used in a variety of systems without disturbing the system being measured.

DETAILED DESCRIPTION

An assay method is provided with which instantaneous or integrated determinations can be made by introducing a compound having a stable nitroxide functionality bonded to a nitronyl group or imino group, the carbon of the nitronyl or imino group being bonded to a methylene group which in turn is bonded to a center having three groups, being chosen so that one of the groups will undergo a change induced by a chemical or physical agent present in the medium, so as to change the degree of asymmetry about the center bonded to the methylene group or one group which due to spatial conformation undergoes a change in the degree of asymmetries. Depending on the particular agent which is to be metered, various functionalities may be employed which are known to respond to the agent with a concurrent change in structure of the functionality.

The basis of the invention is that the nitroxide radicals employed in this invention, are stable to a wide variety of reagents and under a very wide variety of conditions; are amenable to being present, while manifold chemical transformations are carried out on groups bonded to a methylene which in turn is bonded to the nitronyl or imino nitroxide functionality; are capable of being formed with a large variety of compounds, which have an aldehyde or carboxyl functionality, by a simple reaction under extremely mild conditions, and the radical then prepared under relatively mild oxidizing conditions; are measurable in extremely small amounts; and are sensitive to relatively minor changes in their environment, allowing for accurate detection of a change in asymmetry about the center bonded to the methylene group. Thus, one introduces the free radical compositions into a medium where a chemical reaction such as condensation, substitution, elimination, addition, reduction or oxidation, etc. or combinations thereof will occur. The free radical composition has a functionality bonded, directly or indirectly, to the asymmetric center, which upon undergoing a reaction induced by a chemical reagent in the medium results in a change in asymmetry about the central atom. This change in asymmetry changes the electron spin resonance spectrum, which can be metered and by comparison of the electron spin resonance spectrum to known standards, the desired value determined.

Similarly, substituents can be provided which are known to undergo reactions induced by light, heat or electrical energy, whereby the asymmetry about the center bonded to the methylene is changed. By employing known standards, where the light, heat or electrical energy is measured by an extrinsic method, the change in the free radical probe can be used as a determinant of the amount of energy introduced into the system.

The assumptions which are valid for an extremely wide variety of compounds are that the free radical compound does not substantially affect the system which is being measured and that under the conditions of measurement, the change in the functionality bonded to the asymmetric center is not substantially affected by materials which may be present, other than the material to be determined. This is readily achieved in a number of ways, which will be discussed subsequently.

The compounds which find use in this invention have the following formula:

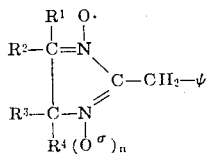

wherein $R^{1-4}$ are organic groups bonded to carbon through a carbon atom, preferably hydrocarbon groups having from 0 to 2 sites, more usually from 0 to 1 site of aliphatic unsaturation, normally of from one to 20 carbon atoms, more usually of from one to 12 carbon atoms, and two of $R^{1-4}$ may be taken together to form a ring either spiro or fused to the 5-membered diazoline ring.

(Whenever hydrogen is used, particularly as to the methylene group bonded to the imidazoline, deuterium and tritium are to be understood as also being intended).

$n$ is 0 or 1, the nitrogen to which ($O^-$) is bonded being positive when $n$ is 1. Preferably, $n$ is 1.

$\psi$ intends a group which has or is capable of having optical isomers. While $\psi$ will almost invariably be used as the racemate, it may be used in either of its optically active forms. Optical isomerism is associated with groups that lack planes of symmetry either because their covalent structures are intrinsically asymmetric or because of non-covalent geometrical restrictions which introduce energetic barriers to symmetrical configurations Both of these types of groups can be used effectively as probes for measurement of chemical reagents.

Normally, the compounds will have from 10 to 200 carbon atoms, more usually of from 10 to 100 carbon atoms, and most usually of from 12 to 60 carbon atoms.

As already indicated, the nature of the groups are such that a functionality is present which will undergo a reaction with a resulting change in asymmetry. Usually this change in asymmetry will involve structural changes of one or more of a set of groups which are attached to a central non-planar atom and are all different. The central atom may be any atom which has at least three valences and is non-planer such as carbon, nitrogen, phosphorous, silicon, or sulfur. Because of synthetic convenience, the central atom will usually be carbon, but it is evident that any of the above indicated heteroatoms can be advantageously employed.

Those compositions which depend on a central atom for optical isomerism, will, for the most part, have the following formula:

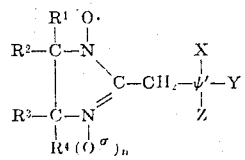

wherein $R^{1-4}$ and n have been defined previously, $\psi'$ is carbon, nitrogen, phosphorous, silicon or sulfur and X, Y and Z are chosen so that, upon a chemical transformation of one or more of the groups X, Y and Z, the asymmetry about the central atom $\psi'$ changes, so as to influence the electron spin resonance spectrum of the compound.

The group $-\psi'XYZ$ will usually have from four to 300 atoms (including hydrogen), more usually from seven to 200 atoms (including hydrogen), generally having from one to 100 carbon atoms, more usually three to 62 carbon atoms and from 0 to 20 heteroatoms. The heteroatoms will usually be the metals of atomic number 3 to 83, and the nonmetals of Groups IIIA to VIIA of the Periodic Chart and of atomic number 5 to 53 inclusive. Preferably, the heteroatoms will be of Groups IIIA to VIA of atomic number 5 to 16, the Group VIIA of atomic number 9 to 53 and the metals of Groups IA and IIA of atomic number 3 to 56.

Usually each of X, Y and Z will be of from one to 100 atoms, more usually X and Y will each be of from one to 50 atoms, more usually of from one to 25 atoms. Conveniently, X and Y may be hydrogen, hydrocarbon, a heterofunctionality or substituted hydrocarbon. Usually, substituted hydrocarbon will have from 1 to 5 heteroatoms.

Those compositions which depend for their optical isomerism on non-covalent geometrical restrictions will for the most part have the following formulas:

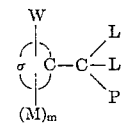

wherein $m$ is 0 to 2, $\theta$ is of from four to 20 carbon atoms usually four to 16 carbon atoms, oxygen, nitrogen and sulfur, and from zero to three heteroatoms, having from four to six annular members, preferably five annular members (a total of six annular members), usually carbon and nitrogen, generally not more than one nitrogen, W is

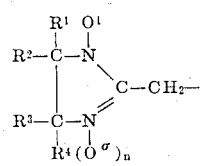

wherein $R^{1-4}$ and $n$ have been defined previously, and is bonded to one of the annular members of $\theta$, usually an annular member directly bonded to the central carbon atom, directly or through a functional group, e.g., oxy, thiooxy, (and oxidized versions thereof, sulfoxy and sulfone), amino, oxocarboxyl, nonoxocarboxyl and combinations thereof. The linking group will usually be of from one to six atoms;

L and M may be the same or different, are hydrogen or of from one to 100 atoms other than hydrogen, e.g., carbon, oxygen, nitrogen, sulfur and phosphorous, L and M preferably being groups of at least three atoms other than hydrogen, usually hydrocarbon or oxygenated hydrogen, such as nonoxocarboxyl (carboxy) and oxy and combinations thereof. P will be the group having the active functionality, so that upon modification of P, there will be a change in the degree of asymmetry about the central carbon-carbon bond and therefore, a change in the average environment of the free radical. P will be described subsequently (see the description of Z'). The M's and P may be taken together to form mono- or bicyclic rings.

A special class of compounds coming within the above class are based on nonfused bicyclic compounds, e.g., biphenyl which for the most part have the following formula:

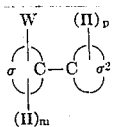

wherein $\theta^{1-2}$ are each of from four to 20 carbon atoms, usually four to 16 carbon atoms, and from zero to two heteroatoms: oxygen, nitrogen, and sulfur, having from four to six annular members, preferably five annular members, usually carbon and nitrogen, W is defined previously;

the $\pi$'s may be the same or different, are hydrogen or from one to 10 atoms, other than hydrogen, e.g., carbon, oxygen, nitrogen, sulfur and phosphorous, and are chosen so as to provide the necessary asymmetry and may be hydrocarbon, heterohydrocarbon (a carbon chain having a heteroatom intermediate between two carbon atoms), substituted hydrocarbon or an organic functionality. The choice of groups is limitless depending on synthetic convenience, the particular system to be assayed and the degree of the effect of the change on the electron spin resonance spectrum. At least one $\pi$ on $\theta^2$ is alpha to the carbon atom involved in the central bond, and preferably W or $\pi$ on $\theta^1$ is alpha to the central carbon atom. Illustrative functionalities will be discussed subsequently.

$m$ is 0 or 1, and $p$ is 1 or 2.

The above compounds will have from about 12 to 200 carbon atoms and from three to 30 heteroatoms, more usually from four to 20 heteroatoms. The compounds with the central atom will usually have from eight to 200 carbon atoms, more usually from 10 to 70 carbon atoms and from four to 23 heteroatoms, more usually, from four to 14 heteroatoms. The compounds which have optical isomerism based on energetic barriers to symmetrical configurations will usually have 18 to 100 carbon atoms and from three to 20 heteroatoms, more usually three to 50 carbon atoms and from four to 16 heteroatoms.

The preferred compounds of this invention will have the following formula:

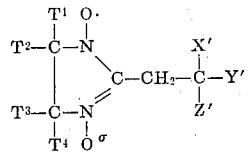

wherein $T^{1-4}$ are hydrocarbon of from one to 12 carbon atoms, usually of from one to eight carbon atoms, and may be aliphatic, alicyclic, aromatic or combinations thereof, two of $T^{1-4}$, i.e., $T^{1-2}$, $T^{3-4}$ and $T^{1-3}$, may be taken together to provide a divalent radical which forms a ring, spiro or fused, with the carbon atoms(s) to which they are attached, having five to seven annular members. The divalent radical will have from three to 16, more usually three to 10 carbon atoms. $T^{1-3}$ may form a mono- or bicyclic ring with the carbon atoms of the imidazoline ring.

At least two of X', Y' and Z' will be different and they may be hydrogen, (which represents deuterium and tritium as independent groups), an organic group bonded by a heteroatom to the central carbon atom, an organic group bonded by a carbon atom to the central carbon atom, and a functionality containing only heteroatoms, usually of from one to six, more usually of from one to four heteroatoms. X', Y' and Z' will vary from one to 100 atoms (including hydrogen), more usually from one to 60 atoms and preferably from one to 30 atoms. The atoms will normally be carbon, hydrogen, oxygen, nitrogen, sulfur, phosphorous, halogen and alkali and alkaline earth metals, but may also include other atoms, such as boron, aluminum, zinc, the Group IB and VIII metals, arsenic, cadmium, mercury, tin, etc. Most frequently, the metals will be present as their cations, with the heavy metals being also present in their oxidized form as anions.

Usually at least one group will be of from one to 20 carbon atoms and from zero to six heteroatoms, more usually of from one to 12 carbon atoms. A second group will be different from the first and be hydrogen, a hydrocarbon of from one to 20 carbon atoms, more usually of from one to 12 carbon atoms, a heterohydrocarbon group of from one to six carbon atoms and from one to six heteroatoms or a heterogroup of from one to six heteroatoms, more usually one to four heteroatoms. Preferably, one of the two groups will have from one to six atoms, which may be hydrogen, carbon, halogen, nitrogen and oxygen. The third group will have the particular functionality involved in the reaction. Alternatively, two or three of the groups may be taken together to form a mono- or bicyclic ring, which has the functionality to be involved in the reaction.

The third group containing the active functionality may be comprised solely of heteroatoms and may have from 0 to 20 carbon atoms and from 0 to 10 heteroatoms, more usually from one to six heteroatoms, being oxygen, nitrogen and sulfur. The functionalities may be varied quite widely including halo, oxy, thiooxy, sulfoxy, sulfone, oxocarbonyl, nonoxocarbonyl: carboxy, particularly carboxylic acids, anhydrides, amides and esters, and the amino and thio analogs of carboxy, nitro; thio acids, such as sulfite, sulfate, thiosulfate, etc.; phosphorous acids, and phosphorous acid derivatives, such as phosphates, phosphonates, phosphonamides, phosphoramides, etc.; amines, including unsubstituted, mono and disubstituted, as well as heteroannular amines; boronic acids, borinic acids; organic functionalities such as mercury derivatives; the metallocene compounds, such as ferrocene, cobaltocene, etc.; nitrogen derivatives such as azo, azido and azoxy, etc. Evidently, almost any functionality can be used, and introduced as a group either directly or indirectly bonded to the center, the primary limitation being that it does not react with the radical compound to destroy the radical.

The most common functionalities which will be present and finding the most common use are hydroxy, sulfoxy, carboxy-salts, esters, amides, and their nitrogen and sulfur analogs -, amino, azido, cyano, isocyanate, isothiocyanate, halo, phosphate, oxo-carbonyl-aldehyde and ketone -, either individually or in combination.

Illustrative groups which may be bonded to the methylene group include 1-hydroxy-1-deuteromethyl, 1-chloroethyl, 1-nitrobutyl, disodio 1-(dihydroxyphosphoryloxy)-1-phenylmethyl, 1-iodo-2-fluoroethyl, 1,2-dihydroxyethyl, 1-cyano-1-phenoxycarbonylmethyl, 1-cyclopentadienylbenzyl, 2-formylcyclohexyl, 1-(2'-oxiranyl)-2-(p-methoxyphenyl)ethyl, 1-acetoxy-1-(N-morpholino)ethyl, 1-acetyl-1-hydroxymethyl, 1-methylsulfatoethyl, 1,2-dicarboxyethyl, 1,2-dicarboxyethenyl, 1-(1'-phenylhydrazino)ethyl,α-azidobenzyl, 1-isothiocyanatodecyl, 1-isocyanatoethyl, 1-glycylaminopropyl, α-(p-chlorosulfonylphenyl)benzyl, dipotassio 1-(2'-pyridyl)-1-(dihydroxyphosphoryloxymethyl)dodecyl, 1-(cysteinyloxymethyl)ethyl, 1-(8'-(2',3'-dichloro-1',4'-dihydroxynaphthyl))-2-methoxyethyl, 1-(urochloroalkylamino)ethyl, Ag 1-(oxycarbonyl)-1-(2'-imidazolyl) methyl, 2-(tryptophanylamino)-1-hydroxyethyl, 1-(2',4',6'-trinitrophenoxy)-1-methoxycarbonylhexyl, 1-acetylethyl, 1-(6,7-dimethyl-9-isoalloxazinyl)butyl,1-calciferoloxyhexyl, 1-(2-amino-4(or 6)-hydroxypteridin-(6 or 4)-oxycarbonyl)ethyl, 1-chlorodimethylsilylcyclohexyl, 6-amino-3-dimethylamino-2,7-dimethylacridinium-10-yl chloride, 1-(thiazylamino)-1-cyanopentyl, 1-chloromercuriethyl, 1 -(dimethoxyboroxy)-2-(1'-naphthyl)ethyl, 1-(α-D-glucopyranosylcarbonyl)heptyl, 1-(pyridinium)-1-carbamoylbutyl chloride, 1-(10'-methyl-9'-anthracenyl)ethyl, α-chlorocarbonyl-p-tert.-butylbenzyl, 2-phenylimino-2-ethoxy-1-(2'-isoxazolyl) ethyl, and 1-(S-thiazolium)ethyl chloride.

With a heteroatom center, illustrative groups are methyl(ethyl)hydroxyethylphosphonium sulfate, methyl(ethyl)carboxymethyl phosphonium bromide, chloro(phenoxy)phosphonyl, methylthio (methoxy)phosphonyl, methylethyl(p-carboxyphenyl)ammonium vanadate, 1-methyl-2-chloropiperidinium fluoride, and hydroxyethyl (methyl)silanyl.

Those compounds which depend on energetic barriers to symmetrical configurations for their optical activity are illustrated by 2'-(tert.-butyloxycarbonyl)-6'-hydroxybiphenyl-2-yl, 2'-trichloromethyl-6-nitroso-2-biphenyl, 2-(2'-isopropyl-5'-nitrocyclopentyl)-3-nitrocyclopentyl, and 2,2-dimethyl-1-(2'-nitro-6'-methoxyphenyl)-1-propyl.

There are three primary ways to prepare the compounds of this invention:

1. The first is to prepare an aldehyde compound with the appropriate functionalities, react the aldehyde with a 1,2-bis(hydroxylamine) and then oxidize the resulting N,N'-dihydroxydiazolidine to the desired radical compound.

2. modify the radical compound by a chemical transformation so as to change one functional group to a different functional group.

3. prepare the radical compound as the 2-halo or 2-halomethyl substituted compound, condense the halo compound with an appropriately functionalized compound and then modify the functionalities as required.

In the first method of preparation, the introduction of an aldehyde group into a wide variety of functionalities is well established. See co-pending application Ser. nos.752,744, filed Aug. 15, 1968, now abandoned; and 740,055, filed June 26, 1968. α-Halo aldehydes may be employed, where the aldehyde is protected as an acetal, and the halogen displaced with a carbanion. Alternatively, when convenient, carboxylic compounds can be reduced to the aldehyde or reacted directly as the ortho ester. Alternatively, hydroboration of an olefin can be followed by treatment with carbon monoxide. The resulting aldehyde is then easily condensed under extremely mild conditions, normally ambient temperatures, with the tetrasubstituted bis-1,2-hydroxylamine.

Once the free radical compound has been formed a variety of substitutions may be carried out on the side chain bonded to the 2 position of the ring. Reactions such as hydrolysis, condensation, esterification, both with organic and inorganic acids, substitutions, oxidation and reduction may be carried out without affecting the diazolidine ring.

Of course, the choice of reagents is somewhat limited, in that some of the oxidants and reductants will react with the diazolidine ring and change the nature of the ring. However, it is frequently possible then to reduce or oxidize the ring back to the desired free radical, without modification of the side chain functionalities. For example, the free radical is reduced by catalytic hydrogenation to a N-hydroxy, N'-oxy imidazoline. Therefore, if one were to add hydrogen to a side chain olefinic group, reduction of the ring would also occur. However, the hydroxyimidazoline is readily oxidized by lead dioxide or sodium periodate. While some consideration of the various functionalities must be made in carrying out the different transformations, most of the reactions are straight forward, follow normal organic chemical preparative techniques, and are readily devised by those skilled in the art.

The third method is to prepare the 2-hydro,2-halo or 2-halomethyl diazolidine, preferably as the free radical compound, and carry out a variety of substitutions with these various functionalities. For example, the carbanion of the 2-unsubstituted nitronyl nitroxide may be reacted with propylene oxide to form the 2-hydroxypropyl nitronyl nitroxide which has an asym-metric center at the 2-carbon atom with an alcohol functionality. Alternatively, α-lithio-2-ethylpyridine may be reacted with the 2-bromomethyl substituted nitronyl nitroxide to provide the asymmetric center. As a third illustration, the bromo analog may be condensed with 2-methylpent-4-en-1-yl magnesium bromide, and the olefin, ozonized to provide the asymmetric center bearing an aldehyde functional group. The resulting compounds can then be further transformed.

In using the compounds of this invention, various systems may be studied and the presence of extremely small amounts of chemicals determined. The critical factors concerning whether a small amount of chemical may be determined, is the equilibrium of the reaction between the free radical probe and the substrate to be determined, the rate of the reaction between the free radical probe and the substrate (only that it not be too slow) and the inertness of the free radical to the substrate or other cofactors necessary to the reaction of the functionality present in the radical and the substrate.

Both rate and equilibria phenomena may be metered, or both, one as a check upon the other. For example, the rate of change of the electron spin resonance spectrum can be followed and extrapolated to zero time, so as to determine the rate at time zero. In those reactions, which go to an equilibrium condition, other than substantial completion, the spectrum can also be measured at the time when there is no further change.

Various systems may be assayed or metered by varying the functionalities at the asymmetric center. For example, the presence of trace metals can be metered either as to all trace metals present in a system or only as to specific trace metals. By appropriate use of functionalities which are known to coordinate with metals, such as amines and carboxylic acids, the amount of polyvalent metals may be determined by introducing the free radical into the system as the acid or alkali metal salt and determining the change in spectrum. By using predetermined standards, the total amount of metal may be determined or the amount of a specific metal may be determined. Illustrative metals include zinc, magnesium, titanium, vanadium, aluminum, iron, silver, etc. The solution containing the metal may be directly introduced into an electron spin resonance capillary which is then introduced into the electron spin resonance spectrometer cavity and measured directly.

Alkylating agents can be determined by the use of amines or carboxylic acids, which form alkylated amines or esters by reaction with the alkylating agent. Illustrative alkylating agents are dimethylsulfate, methyliodide, etc.

Alcohols, primary and secondary amines, and carboxylic acids may readily be determined by having an active functionality which reacts with such groups, such as acyl halides, isocyanate, isothiocyanate, carboxylic acid anhydrides, etc.

Atmospheric pollutants may be determined such as benzoyl nitrite, by having functionalities present which are sensitive to reaction with the benzoyl group, such as alcohols, amines, and metal salts of amines, where the nitrogen is a heteroannular member of a ring, as in imidazole. Alternatively, ozone may be analyzed by having oxidation susceptible groups such as electron rich olefins, dyes or polyhydroxylated benzene rings in an alkali medium. Depending on the degree of hydroxylation of the benzene ring, oxygen may also be analyzed, with di- or trihydroxy benzenes and an appropriate metal catalyst.

The oxidation capacity of trace materials in the air, such as ozone or nitrogen oxides, may be determined by the use of oxidation sensitive compounds, such as dyes or polyhydroxylated benzene, in the presence of catalyst such as copper and nickel. Sulfur trioxide may also be metered by having a primary amine group present, so as to form the sulfonamide.

Similarly, the combustion products from the exhaust of a motor, such as an internal combustion engine, may be metered by having present the appropriate functionalities under conditions where reaction will occur. For example, an amine may be present so as to form an imine with a ketone; acid anhydrides or acyl halides, both organic or inorganic, may be present to react with hydroxylic functions to form esters. These reactions are well known and the necessary catalyst and conditions for optimizing the reactions have been elucidated in the literature.

Also, where possible, competitive reactions can be utilized, for example, where the free radical compound compete with a substrate for an insufficient amount of a reagent. Thus, biological oxygen demand (BOD) of a solution can be metered, by using a controlled amount of oxygen. Equilibrium constants can be determined, for example, the binding of metal ions to an enzyme, by knowing the equilibrium constant of the free radical compound with the particular cation.

As for the metering of the introduction of energy, such as light, heat and electrical, various compounds can be used which will react at an electrode. For example, carboxylic acids may be decarboxylated to be replaced by a proton at the asymmetric carbon. Alternatively, nitro groups may be reduced by varying degrees, so as to produce a variety of compounds. Light can be metered in a number of ways. By using a silver salt, under conditions whereby the silver ion is reduced to the silver metal, light intensity can be determined by the carboxylate salt going to the carboxylic acid. Functional groups can be present which undergo reduction or oxidation, at the particular wave length being metered. For example, an alcohol may be used which upon oxidation destroys the asymmetry. In the presence of benzophenone, the alcohol will transfer hydrogen to the benzophenone to form benzhydrol. In addition, by using rigid ring compounds, additional ring condensations can be introduced which will result in a change in asymmetry. Finally, in extreme conditions, the compounds of this invention may be used as probes for temperature. By having functionalities whose reaction rates have been carefully determined at a variety of temperatures, the probe can be introduced into a system at an unknown temperature, held there for a specific time and then withdrawn and the electron spin resonance spectrum determined. By virtue of the change in the spectrum, the rate of reaction can be determined which can then be directly related to the temperature of the system.

The free radical compounds will normally be used at temperatures in the range of $-100°C.$ to $110°C.$, preferably in the range of $-30°C.$ to $60°C.$ While temperatures above $110°C.$ may be employed in specific situations, for the most part, with increasing temperatures the radical begins to decay, introducing an additional and undesirable variable into the assay method. While the variable can be compensated for, it is preferable that it not be present. As already indicated, the concentrations required for accurate measurement may be as low as $10^{-8}M$, and may range as high as desired. At high concentrations, aliquots can be taken and diluted to concentrations which are convenient for spectrometric measurement. Preferably, concentrations will be employed in the range of $10^{-7}$ to $10^{-3}$ M.

The free radical compounds are sensitive to strong alkali and strong acid. Therefore, in most instances, solutions will not have concentrations of hydroxide ion greater than 2 N (or the equivalent in nonaqueous systems), preferably, not greater than 1 N. Concentrations of hydronium ion will be no greater than $10^{-1}$ M, preferably, no greater than $10^{-2}$ M.

Also, the diazoline rings can be reduced with destruction of the free radical by a variety of reagents.

To that extent, strong reducing agents can be assayed by the subject invention only after reformation of the free radical functionality by an appropriate oxidizing agent.

The following examples demonstrate a variety of ways of introducing a wide variety of different functionalities into molecules having the nitronyl nitroxide or imino nitroxide free radical functionality.

(All temperatures are reported in Centigrade).

EXAMPLE I — 3-(4,4,5,5-tetramethyl-2-imidazolinyl-3-oxide-1-oxyl)-2-(2-pyridyl)-1-propyl phosphate A. Into a reaction flask containing 10 g. of ethyl 2-pyridyl acetate (60.6 mmole) in 100 ml. of dimethyl formamide at 0°C. was added 1.46 g. of sodium hydride (60.6 mmole). After stirring the mixture under nitrogen for 10 minutes, the mixture was warmed to 25°C. and stirred for 30 minutes, then recooled to 0°C. To the mixture was then added dropwise 18.0 g. of bromoacetaldehyde diethyl acetal (91.2 mmole) in 20 ml. dimethylformamide and the mixture stirred while being warmed in a 70°C. bath for 5 hours, followed by standing overnight at ambient temperatures. The reaction mixture was then poured into water, washed 3 times with ether, the ether solutions combined and washed once with aqueous sodim chloride followed by drying, evaporation of the ether and distillation to give 8.5 g. of product (b.p. 125°–135°C./0.1 mm. Hg.). Mass spectral analysis, as well as the infrared spectrum and nuclear magnetic resonance spectrum were consistent with the desired product, ethyl gamma, gamma-diethoxy-alpha-(2-pyridyl) butyrate.

B. To a solution of sodium dimethoxyethoxy aluminum hydride (0.635 ml. of 70 weight percent solution in benzene) under nitrogen was added 0.344 g. of the above ester (1.22 mmole) and 3 ml. benzene. After stirring for 24 hours at ambient temperatures, water was cautiously added to destroy the excess reducing agent. The organic phase was then dryed over magnesium sulfate, filtered and evaporated to yield 0.342 g. of crude product. The alcohol product was purified by preparative thin layer chromatography (TLC) on silica with 10 percent methanol:ether as eluent. The product distilled at 130°C./0.1 mm. Hg. The infrared and NMR spectra were consistent with the product as 4,4-diethoxy-2-(2-pyridyl)-1-butanol.

C. Into a reaction vessel was introduced 0.74 g. of the above acetal (3.12 mmole) and 9.0 ml. of 0.69 M cyanoethyl phosphate (6.23 mmole) and the mixture dehydrated by 3 evaporations with anhydrous pyridine. To the mixture was then added 20 ml. dry pyridine and 3.84 g. of dicyclohexylcarbodiimide (18.6 mmole). After stoppering the mixture and stirring at ambient temperatures for 2 days, 1 ml. water was added, followed an hour later by an additional 10 ml. of water. The insoluble urea which formed was removed by filtration. The filtrate was evaporated, keeping the temperature below 35°C. and a solution of lithium hydroxide (50 ml., 0.5 M) was added and the mixture refluxed under nitrogen for 40 minutes.

After cooling the mixture to 25°C.,it was acidified to pH 3 with hydrochloric acid. After refluxing for 30 minutes followed by evaporation to dryness, the residue was dissolved in a mixture of 10 ml. of water and 40 ml. of methanol and the pH adjusted to neutral with dilute base. To the solution was then added, 2,3-dimethyl-2,3-bis(hydroxylamino)butane (0.5 g.) and the solution stirred at 25°C. for 2 hours. After evaporation of the solvent, the residue was dissolved in saturated aqueous sodium bicarbonate and aqueous sodium periodate cautiously added. After each addition of a few drops of the oxidant, the mixture was vigorously shaken. The addition of oxidant was continued until no further increase in radical coloration could be detected by visual observation. The red aqueous solution was washed twice with chloroform, followed by freeze drying to a light purple powder which was triturated with methanol, then filtered. The methanol was evaporated to give 500 mg. of a dark purple solid.

The product had the following ESR spectrum:
(pH 3) $a_N = 8.0, a_{H_1} = 2.75, a_{H_2} = 1.7$ gauss;
(pH 9) $a_N = 8.0, a_{H_2} = 3.3, a_{H_2} = 0.7$ gauss.

D. The alcohol free radical product derived from hydrolysis of the phosphate ester may be prepared directly as follows:

Into a reaction vessel was introduced 0.10 g. of the above acetal, 2 ml. ethanol and 10 ml. 0.1N hydrochloric acid. The mixture was refluxed for 1 hour, diluted with water, and extracted with chloroform. The aqueous phase was then adjusted to pH 9 by addition of base and the crude aldehyde extracted into chloroform. The organic solvent was removed, the residue dissolved in 5 ml. methanol, and 100 mg. 2,3-dimethyl-2,3-bis(hydroxylamino)butane was added. After 5 hours at room temperature, the radical was prepared by sodium periodate oxidation of the diazole as described above. The volatile materials were evaporated and the crude product purified with preparative thin layer chromatography on silica using 10:1 ether:methanol as eluent. The major product (r.f. = 0.4) was 3-(4',4',5',5' - tetramethyl - 2' - imidazolinyl - 3' - oxide - 1 - oxyl)-2-(2"-pyridyl)-1-propanol.

The product had the following ESR spectrum:
(pH 6.39) $a_N = 8.07, a_{H_1} = 2.89, a_{H_2} = 1.25$ gauss.

EXAMPLE 2 — 2-(5'-(1''-methylbutyl)-5'-(1'',3''-dioxy-4'',4'',5'',5''-tetramethyl-4'',5''-dihydro-2''-imidazomethyl) barbituryl)ethyl phosphate A. To 3.13 ml. (3 × 10⁻³ mol) of 0.96 M. sodium ethoxide in ethanol was added 1.1 g (3 × 10⁻³ mol) of 5-(methylbutyl)-5-(1,3-dioxy-4,4,5,5-tetramethyl-4,5-dihydro-2-imidazomethyl)barbituric acid (prepared as described in co-pending application Ser. No. 794,008, filed Jan. 27, 1969, now abandoned). After stirring the mixture for 2 hours, the methanol was removed in vacuo and a solution of 0.369 g. of β-chloroethyl acetate in 15 ml. of dry dimethyl formamide was added. After heating the mixture at 48°C. for 48 hours with stirring, the dimethyl formamide was removed in vacuo, leaving a residue which was dissolved in 2 N aqueous sodium hydroxide. After extracting the solution with methylene chloride, the aqueous phase was allowed to stand for 2 hours, acidified with acetic acid to a pH 5 and then extracted again with methylene chloride. The extracts were dried over sodium sulfate and the volatiles removed in vacuo.

The residue was dissolved in benzene and 0.16 g. of pyridine (0.0021 mol) and 0.16 g. of trimethylsilylchloride (0.0015 mol) were added. After stirring the mixture for 2 hours and then removing all volatiles in vacuo, the product was purified by preparative thin layer chromatography. After removing the product from the silica gel with methanol, two drops of acetic acid were added and the solution heated to about 50°C. under nitrogen and maintained at that temperature for 16 hours. The methanol was then removed in vacuo and the product purified by preparative thin layer chromatography (3:1 benzene/acetone) to yield 61 mg. of the desired product.

B. In 120 ml. of dry pyridine to which had been added 3 ml. of a 0.674 M solution of cyanoethyl phosphate ($2 \times 10^{-3}$ mol) in pyridine was added 400 mg. of the above product and the solution taken to dryness in vacuo, while maintaining the temperature below 30°C. To the residue was added 20 ml. of dry pyridine, the solution evaporated and this treatment with pyridine repeated two additional times.

Finally, an additional 20 ml. of dry pyridine was added and 1 g. of dicyclohexylcarbodiimide ($4 \times 10^{-3}$ mol). After allowing the solution to stand for 16 hours (care should be taken that the time is not unduly extended), 1 ml. of water was added, the mixture stirred for 2 hours, filtered and volatiles removed. The residue was a gum which was dissolved in buffered water having a pH 4.8 and the aqueous solution extracted with methylene chloride. The aqueous phase was taken to dryness in vacuo, keeping the temperature below 30°C., leaving a gum.

The gum was dissolved in 20 ml. of 0.5 M aqueous lithium hydroxide, the solution heated at 50°C. for 5 hours and then acidified to a pH 6 with acetic acid. After centrifugation to remove insoluble inorganic phosphate, the solution was taken to dryness in vacuo maintaining the temperature below 30°C. to yield a gum which was purified by preparative thin layer chromatography. The product was a hygroscopic solid, which while contaminated with silica gel, was a single compound by thin layer chromatography.

EXAMPLE 3 — Leucyl 2-(o-benzyloxyphenyl)-4-(4',4',5',5'-tetramethyl-2'-imadazolinyl-3'-oxide-1'-oxyl)-1-butylamine A. A mixture of 8 g. of methyl o-hydroxyphenylacetate (4.82 mmole), 7.9 g. of benzyl chloride (6.25 mmole), 8.0 g. of potassium iodide (4.82 mmole), 26.8 g. of potassium carbonate (19.2 mmole) and 175 ml. acetone was stirred and refluxed for 24 hours. The solids were removed by filtration and the filtrate evaporated to dryness. After dissolving the residue in ether, the ether solution was washed with dilute base followed by saturated aqueous ammonium chloride. Evaporation of the volatiles gave a yellow oil which was vacuum distilled, boiling at 155°–162°C. at 0.3 mm. Hg. The light yellow oil crystallized on standing and could be recrystallized from ether-hexane.

B. To a cold solution of 3.03 g. of methyl o-benzyloxy-phenylacetate (11.8 mmole) in 50 ml. dry dimethyl formamide under nitrogen was added 0.34 g. of sodium hydride (14.2 mmole), the solution stirred at room temperature for 1 hour, and then recooled at 5°C. To the solution was then added dropwise over 5 minutes a solution of 3.5 g. of bromoacetaldehyde diethyl acetal (17.7 mmole) in 5.0 ml. dimethyl formamide. After stirring the mixture at 25°C. for 3.5 hours, the mixture was poured into water and the water extracted 4 times with ether. The combined ether extracts were evaporated to give a light yellow oil distilling at 190°–192°C. at 0.1 mm. Hg.

C. Saponification was carried out as follows:

Diluted aqueous methanolic sodium hydroxide was mixed with the ester and refluxed for about 1.5 hours. The solution was cooled, diluted with water and extracted repeatedly with chloroform to remove unreacted starting material. The aqueous solution was then acidified to pH 3, and extracted with chloroform to provide the carboxylic acid.

The mixed anhydride was prepared by combining the above product with a 10-fold mole excess of triethylamine in ether and cooling to 0°C. A solution of the stoichiometric amount of ethyl chloroformate in a small amount of ether was added dropwise with stirring. The reaction was stirred at 0°C. for 1 hour. The product was filtered free of amine hydrochloride salt and the solvents removed in vacuo to leave the product as a residue.

D. To a saturated ethereal solution of ammonia was added dropwise 2.05 g. of the above product (4.77 mmole) in ether at 5°C. with vigorous stirring. An excess of ammonia was maintained. After stirring at 5°C. for 30 minutes and at ambient temperatures for an additional 30 minutes, the solution was evaporated to yield a light yellow oil.

E. To a suspension of 0.66 g. of lithium aluminum hydride (17.5 mmole) in 40 ml. tetrahydrofuran under nitrogen at 0°C. was added a solution of 2.11 g. of the above product (5.8 mmole) in 10 ml. tetrahydrofuran. The mixture was stirred for 1 hour at 25°C. and then refluxed for 5 hours. After cooling the mixture to 5°C., the excess hydride was decomposed by the cautious addition of saturated aqueous sodium sulfate. The organic solution was decanted from the inorganic salts, the salts washed several times with ether and the combined ether phases dried and evaporated to yield 1.74 g. of a light yellow oil. Purification was achieved by chromatography on silica with ether as the initial eluent to remove traces of starting material. Elution with 20 percent methanol/ether gave 1.68 g. of the amine product as a light yellow oil.

A solution of 100 mg. 2-(o-benzyloxyphenyl)-,4-diethoxy-1-butylamine, 10 ml. 0.1 N hydrochloric acid and 2 ml. methanol was stirred at 80°–90°C. for 15 minutes and then evaporated to dryness. The residue was dissolved in 10 ml. methanol and 1.0 N sodium hydroxide was added to provide pH 8. 2,3-Dimethyl-2,3-bis-(hydroxylamino)butane (100 mg.) was then added and after 1 hour at 25°C. the crude diazole was converted to 2-(o-benzyloxyphenyl)-4-(4,4,5,5-tetramethyl-2-imidazolinyl-3-oxide-1-oxyl)-1-butylamine by oxidation with sodium periodate in the manner described in Example 1.

The product had the following ESR spectrum:
(pH 4.35) $a_N = 8.12, a_{H_1} = 3.21, a_{H_2} = 0.9$ gauss;
(pH 7.8) $a_N = 8.10, a_{H_1} = 3.15, a_{H_2} = 0.8$ gauss;
(pH 12.8) $a_N = 8.20, a_{H_1} = 3.0, a_{H_2} = 1.12$ gauss.

EXAMPLE 4 — 2-(2-(o-carboxyphenyl)-1-propyl)-4,4,5,5-tetramethyl imidazolin-3-oxide-1-oxyl choline ester A. To a solution of 4-methyl-1-tetralone (10. g., 62 mmole) in 200 ml. of glacial acetic acid was added two equivalents of lead tetraacetate (55.0 g., 124 mmole). The mixture was stirred at 60°C. under nitrogen until the majority of the lead tetraacetate dissolved. Boron trifluoride etherate (8.8 g., 62 mmole) was added and the resultant brown mixture was stirred for a total of 72 hours under nitrogen at room temperature. During this period one additional equivalent of lead tetraacetate (28 g., 62 mmole) was added (when the KI-starch test indicated that the original two equivalents had been used up).

The reaction mixture was cooled to room temperature and poured into 1 l. of water. The aqueous phase was extracted with two 200 ml. portions of ether. Then the aqueous and organic phases were filtered through Celite to remove the lead salts. The aqueous phase was again extracted with five 200 ml. portions of ether. The combined ether solutions were washed successively with two 500 ml. portions of saturated aqueous sodium chloride, dilute aqueous sodium carbonate to pH 7, and two 250 ml. portions of saturated aqueous ammonium chloride. The ether solution was then dried and concentrated in vacuo to give 13.1 g. of crude product (major product on TLC, silica, ether--hexane (1:3)).

This mixture was purified by distillation to give 9.2 g. (68 percent) of pure 2-acetoxy-4-methyl-1-tetralone as a viscous yellow liquid, boiling at 131°–138°C. at 0.075 mm. Hg.

On standing at 0°C. for three days this liquid afforded crystals. An analytical sample was recrystallized from ether--hexane to give white crystals, m.p. 81°C.

B. The above product (1.5 g., 6.9 mmole) was dissolved in 25 ml. of methanol. The solution was degassed with nitrogen, and 25 ml. of 1 of N hydrochloric acid was added. The resultant solution was refluxed for 3 hours under nitrogen. The solvents were removed in vacuo (40°C., 1 mm. Hg.). The resultant yellow oil was used directly without further purification.

C. To the crude 2-hydroxy-4-methyl-1-tetralone (1.23 g., 7.0 mmole) prepared above dissolved in 100 ml. of ethanol was added dropwise at room temperature a solution of sodium metaperiodate (2.13 g., 9.1 mmole) in 100 ml. of 1 N sulfuric acid. Stirring was continued at room temperature for 17 hours.

The ethanol was removed in vacuo (50°C.) and the resultant aqueous phase was extracted with four 100 ml. portions of chloroform. The combined chloroform solutions were washed with dilute aqueous sodium bicarbonate to pH 8–9. This basic solution was reacidified with dilute hydrochloric acid, and the acid reextracted into chloroform. The combined chloroform solutions were washed with saturated aqueous sodium chloride, dried (anh. $Na_2SO_4$), and concentrated in vacuo to give 2-(o-carboxyphenyl)butylaldehyde as a viscous oil.

D. To a solution of the above acid (773 mg., 4.0 mmole) in ether (25 ml.) at 0°C. under nitrogen was added freshly distilled triethylamine (4 g., 40 mmole). Ethyl chloroformate (0.43 g., 4.0 mmole) dissolved in 10 ml. of ether was then added dropwise at 0°C. Stirring was continued at the cold temperature for 1 hour. The resultant mixture was allowed to warm to room temperature and filtered to remove the precipitated triethylamine hydrochloride. It was then concentrated in vacuo. The n.m.r. indicated it to be the mixed anhydride, with some triethylamine still present. This material was used without further purification.

E. The above crude mixed anhydride (1 g., 4 mmole) was dissolved in 30 ml. of DMF and 20 ml. of pyridine. Choline chloride (1 g., recrystallized from isopropanol, and dried in vacuo) was added and the mixture stirred vigorously overnight (18 hours). The solid unreacted choline chloride was filtered off and the solvent removed in vacuo (50°C. at 1 mm. Hg.). The residue was taken up in a mixture of chloroform and water. The aqueous phase was extracted with three 50 ml. portions of chloroform and used without further purification.

F. To the aqueous solution was added an excess of 2,3-dimethyl-2,3-bis-(hydroxylamino)butane. The aqueous solution was stirred at room temperature for 4 hours. A large excess of lead dioxide was added and the resultant mixture stirred vigorously for 5 minutes. The lead dioxide was removed by filtration through Celite. The aqueous solution was then made acidic to pH 3 by the dropwise addition of 1 N hydrochloric acid, extracted with three 50 ml. portions of chloroform and freeze dried. The residue was dissolved in a minimum amount of chloroform--methanol (3:1). It was filtered to remove insoluble salts and subjected to preparative thin layer chromatography (TLC) (silica, chloroform--methanol(3:1). Extraction of the plates with methanol--acetic acid (100:1) and concentration in vacuo (40°C. at 1 mm. Hg.) of the extracts gave a residue containing some silica gel. This silica gel was removed by the addition of a small amount of acetone followed by filtration. The filtrate on evaporation in vacuo yielded an amorphous powder which did not crystallize but was shown to be pure by TLC.

The product had the following ESR spectrum:
(pH 6.92) $a_N = 8.12$, $a_{H_1} = 3.21$, $a_{H_2} = 1.18$ gauss.

Alternatively, the carboxylic acid group need not be esterified before the imidazolidine ring is formed.

G. The aldehyde as obtained from the periodic acid oxidation (D.) was dissolved in methanol--water (1:1). Excess 2,3-dimethyl-2,3-bis-(hydroxylamino)butane was added and the resultant solution stirred at room temperature for 1 hour.

The mixture was oxidized with aqueous sodium metaperiodate and the aqueous solution adjusted to pH 3 by the dropwise addition of dilute hydrochloric acid. The mixture was extracted with chloroform and the chloroform phase washed with saturated aqueous sodium chloride, dried and concentrated in vacuo. The crude radical product was purified by preparative thin layer chromatography (TLC) (silica, benzene—acetone—glacial acetic acid (100:400:1).

The product had the following ESR spectrum:
(pH 3.49) $a_N = 8.19$, $a_{H_1} = 2.79$, $a_{H_2} = 1.38$ gauss;
(pH 9.86) $a_N = 8.16$, $a_{H_1} = 2.38$, $a_{H_2} = 1.69$ gauss.

EXAMPLE 5 — Ethyl 2-(2'pyridyl)-3-(4'',4'',5'',5''-tetramethyl-2''-imidazolinyl-3-oxide-1-oxyl)propionate A. To a solution of 10 g. of ethyl 2-pyridylacetate (60.6 mmole) in 100 ml. dimethyl formamide cooled to 0°C. was added 1.46 g. sodium hydride (60.6 mmole). The reaction was stirred under nitrogen for 10 min., warmed to 25°C. and stirred 30 min., then recooled to 0°C. A solution of 18.0 bromoacetaldehyde diethyl acetal (91.2 mmole) in 20 ml. dimethyl formamide was added dropwise and the reaction was then stirred and placed in a 70°C. bath for 5 hours and let stand at 25°C. overnight. The mixture was poured into water and washed 3 times with ether. The ether solutions were washed once with salt, dried, evaporated and distilled to give 8.5 g. (49 percent) of the product as a light yellow oil (b.p. 125°–135°/0.1 mm).

B. A solution of 0.660 g. pyridyl-ester-acetal (2.42 mmole) in 5 ml. ethanol and 20 ml. 0.1 N hydrochloric acid was refluxed for 30 min. and evaporated to dryness. The residual oil was dissolved in 20 ml. methanol and 0.358 g. of 2,3-dimethyl-2,3-dihydroxylaminobutane (2.42 mmole) was added. After 1.5 hours at 25°C. the solution was diluted with water, aqueous sodium bicarbonate and chloroform. An aqueous solution of sodium periodate was added in portions, with vigorous shaking between additions, until additional oxidant no longer increased the radical color. The chloroform solution was washed, dried and evaporated to a red oil which was chromatographed on silica with 5 percent methanol-ether as eluent. A total of 0.255 g. of the radical product was obtained as a viscous oil.

Using the exemplary compounds prepared above, a number of assays were carried out. One group of assays is concerned with determination of enzymatic activity of a particular substrate. Various enzymes were assayed, such as phosphatases, peptidases and choline esterases. The following examples demonstrate the use of the subject compositions for analysis of enzymes.

In the first example, alkaline phosphatase was assayed.

To a dilute solution of the phosphate free radical of Example 1 in pH 8.5 buffer was added 3 $\mu$l. of Boerringer-Mannheim alkaline phosphatase (A = 300 I.U./ml.), the solution mixed, transferred to an ESR capillary and introduced into the ESR cavity. With 2 minutes after the addition, no phosphate radical could be detected by ESR. Both the ESR spectrum and thin layer chromatography (TLC) of the product confirmed complete conversion to the alcohol.

ESR: (product) (pH 8.5) $a_N = 8.0, a_{H_1} = 1.4, a_{H_2} = 3.0$ gauss;
(substrate) $a_N = 8.0, a_{H_1} = 0.7, a_{H_2} = 3.3$ gauss.

The next assay was carried out with the compound of Example 2. Two 20 $\mu$l. of a solution 1.21 × $10^{-3}$ M. in the subject subject compound, 1 × $10^{-3}$ M. in magnesium chloride and 1.5 M in 2-aminopropanol buffer, pH 9.24, was added 20 $\mu$l. of human serum containing alkaline phosphatase. The mixture was allowed to stand for 25 minutes at 25°C. During this time the ESR spectrum indicated a partial conversion of the starting phosphate to the product alcohol. The spectral changes were nearly linear and the rate was proportional to the enzymatic activity.

The next method was used for assaying for leucine amino peptidase. The compound of Example 3 was employed. A sufficient amount of the compound was dissolved in a solution prepared from 1 ml. of 0.2 M triethanolamine (pH 8.6), 0.5 ml. of 1.25 N magnesium chloride and 1 ml. of water, to give approximately a 5.0 × $10^{-4}$ M solution. To 0.1 ml. of the substrate solution was added 0.1 ml. of an activated enzyme solution. This solution was prepared by incubating 0.5 ml. of Hyland Laboratories Special Clinical Chemistry Control Serum with 0.1 ml. of 0.025 M manganese chloride, 0.1 ml. of 0.2 M triethanolamine, pH 8.6, and 0.5 ml. water at 40°C. for 2 hours. The reactants were mixed at room temperature and transferred to an ESR tube and inserted into the spectrometer. Only the signal of the left hand pair of lines of the middle multiplet of the 5 × 4 line spectrum was recorded. The ratio of the differences of the signal maxima and minima (1–4) (2–3) was measured as a function of time. The slope of the resulting function was directly proportional to the enzymatic activity.

The next example was concerned with the assay of cholinesterase. The product of Example 4 was dissolved in a phosphate buffer at pH 6.92 ($10^{-5}$ M). Cholinesterase was added and the ESR spectrum studied over a 5 hour period. The rate of the spectral changes was proportional to the amount of the enzyme that was added.

ESR of starting choline ester: (Example 7) (pH 6.92)
$a_N = 8.12, a_{H_1} = 3.21, a_{H_2} = 1.18$ gauss;
ESR of final acid:
$a_N = 8.1, \overline{a}_{H_1} = 2.4, a_{H_2} = 1.6$ gauss.

Using the composition of Example 5, the solution was assayed for zinc. The carboxylic acid obtained by hydrolysis of the ester was employed as a 7 × $10^{-5}$ M solution in pH 10.9 buffer. A sample of this solution was added to $10^{-2}$ M solution of divalent zinc cation. At a radical concentration of 2 × $10^{-4}$M, divalent zinc cation could be detected at a concentration of 5 × $10^{-1}$ M.

ESR: (carboxy radical) $a_N = 8.0, a_{H_1} = 3.0, a_{H_2} = 1.3$ gauss; (carboxy radical plus zinc cation at 5 × $10^{-1}$ M) $a_N = 8.0, a_{H_1} = 2.4, a_{H_2} = 2.0$ gauss.

By employing specific reagents for a variety of cations, and bonding them to an asymmetric center, the concentration of metal ions at low concentrations can be determined rapidly. For example, N-ethyl-8-hydroxytetrahydroquinoline hydrochloride can be used for an assay of arsenic; 8-hydroxyquinoline or quinalizarine can be employed for aluminum; 1,4-dihydroxyanthraquinone-2-sulfonic acid may be used for detecting beryllium; pyrogallol carboxylic acid and sodium sulforicinate may be used for detecting calcium; dimethylglyoxime and 3,5-dimethylpyrazole may be used for detecting cobalt; para-dimethylaminobenzalrhodanine or phenylthiohydantoic acid may be used for detecting copper; malachite green or dimethylaminobenzylidene rhodanine may be used for detecting gold; para-nitrobenzeneazoalpha-naphthol may be used for detecting magnesium; alpha-benzoin oxime may be used for the detection of molybdenum; diphenylthiocarbazone or formazylcarboxylic acid may be used for the detection of silver; 8-hydroxyquinoline or phenylarsonic acid may be used in the detection of thorium; and alpha-quinaldinic acid may be used in the detection of uranium. This list is not intended to be exhaustive, but merely indicates a variety of functional groups which may be used, bonded directly or indirectly to the asymmetric center, for the determination of the presence of particular metal ions in solution.

As is evident from the foregoing examples, the subject method provides a sensitive probe for metering a wide variety of chemical reactions. By virtue of the versatility of the system, in that a wide variety of functionalities may be introduced into the molecule, both in vivo and in vitro reactions can be monitored. Furthermore, the method is easily standardized so that rapid and efficient determinations can be obtained with an electron spin resonance spectrophotometer. Also, the extreme sensitivity of the electron spin resonance spectrophotometer to the absolute number of unpaired electrons permits determinations at extremely low concentrations and of very small amounts of materials. Furthermore, the substantial absence of background noise provides for accurate determinations.

In addition, the variation of spectrum with relatively subtle changes occurring about the asymmetric center permits wide use of the subject method and easy preparative procedures to achieve compounds which are useful for a variety of determinations. In many instances, reagents which are well known for particular determinations may be bonded at a convenient position to the asymmetric center, so that in undergoing its known change, there is a resultant change in the electron spin resonance spectrum. Therefore, known techniques are readily adapted to the subject method.

What is claimed is:

1. A method for detecting in a fluid medium the presence of a chemical or physical agent which induces a chemical reaction other than destruction of a nitroxide free radical or other than the loss or addition of a proton due to change of acidity in said medium which comprises:

introducing into said medium a compound of the formula:

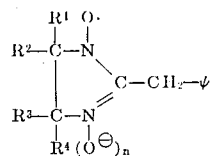

wherein $R^{1-4}$ are organic radicals bonded to carbon through a carbon atom, $n$ is 0 or 1, the nitrogen to which the oxygen is bonded being positive when $n$ is 1, and $\psi$ is a group which has or is capable of having optical isomerism and which upon undergoing a chemical reaction induced by said chemical or physical agent, undergoes a change in asymmetry; and determining the electron spin resonance spectrum of the medium, after a time sufficient to have provided a chemical change with the presence of said agent in said medium.

2. A method according to claim 1, wherein $n$ is 1 and $\psi$ is of the formula:

wherein $\psi$ is of from 4 to 300 atoms, $\psi'$ is carbon, nitrogen, phosphorous, silicon or sulfur, and X and Y are of from one to 50 atoms, are different and are hydrogen, hydrocarbon, heterofunctionality or substituted hydrocarbon, and Z has a functionality which upon chemical transformation, results in a change in asymmetry about $\psi'$.

3. A method according to claim 2, wherein $\psi'$ is carbon.

4. A method according to claim 2, wherein X and Y are each of from one to 25 atoms and are hydrogen, hydrocarbon or substituted hydrocarbon.

5. A method according to claim 1, wherein $\psi$ is

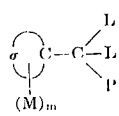

wherein $m$ is 0 to 2, $\theta$ is of from four to 20 carbon atoms, L and M are hydrogen or groups of from 0 to 10 atoms other than hydrogen and are different than P and are chosen to provide the necessary asymmetry about the central bond, and P has a functionality which upon chemical transformation results in a change in asymmetry about the double bond.

6. A method according to claim 1, wherein $\psi$ is of the formula:

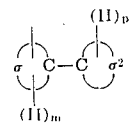

wherein $\theta^{1-2}$ are each of from four to 20 carbon atoms having from four to six annular members, the $\pi$'s may be the same or different and are other than hydrogen, at least one $\pi$ on $\theta^2$ being alpha to the carbon atom involved in the central bond, and $m$ is 0 or 1, and $p$ is 1 or 2.

7. A method according to claim 1, wherein said compound has the formula:

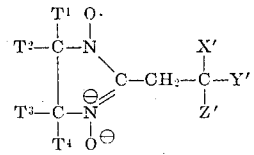

wherein $T^{1-4}$ are hydrocarbon of from one to 12 carbon atoms, at least two of X', Y' and Z' are different and are hydrogen, an organic group bonded by a heteroatom to the central carbon atom, an organic group bonded by a carbon atom to the central carbon atom, and a functionality containing only from one to six heteroatoms and Z' is from one to 60 atoms which are carbon, hydrogen, oxygen, nitrogen, sulfur, phosphorous, halogen, or alkali and alkaline earth metals.

8. A method according to claim 7, wherein at least two of X', Y' and Z' are taken together to form a ring.

9. A method according to claim 7, wherein X' is hydrogen or a hydrocarbon group of from one to 12 carbon atoms, Y' is a heterohydrocarbon group of from one to 12 carbon atoms and of from one to six hetero atoms, and Z' is of from 0 to 20 carbon atoms and from one to six hetero atoms which are oxygen, sulfur or nitrogen.

10. A method according to claim 7, wherein $T^{1-4}$ are methyl, X' is hydrogen or alkyl of from one to six carbon atoms, Y' is a heterohydrocarbon group of from one to six carbon atoms and from one to four hetero atoms which are nitrogen or oxygen, and Z' is of from 0 to 20 carbon atoms and from one to six hetero atoms.

11. A method according to claim 7, wherein the chemical is the zinc cation, $T^{1-4}$ are methyl, X' is hydrogen, Y' is pyridyl and Z' is carboxy.

12. A method according to claim 7, wherein Z' has a carboxy or amino group as its hetero functionality.

13. A method according to claim 7, wherein X' and Y' are different and are hydrogen or hydrocarbon of from one to 12 carbon atoms and Z' has a heterocyclic functionality and is of not more than 20 carbon atoms and of from one to six hetero atoms.

14. A method according to claim 13, wherein said heterocyclic functionality is quinoline, pyrazole, rhodanine, quinaldine, tetrazine, imidazoline, or indole.

15. A method according to claim 7, wherein X' is hydrogen or alkyl, Y' is a heterohydrocarbon group of from one to 12 carbon atoms and one to six heteroatoms which are nitrogen, oxygen or sulfur and 2' has a heterocyclic functionality and is of not more then 20 carbon atoms and of from one to six heteroatoms.

* * * * *